United States Patent
Hassebrauck

(10) Patent No.: US 8,245,854 B2
(45) Date of Patent: Aug. 21, 2012

(54) CONE SHAPED FILTER INSERT

(75) Inventor: Michael Hassebrauck, Petershagen (DE)

(73) Assignee: Melitta Haushaltsprodukte GmbH & Co. KG, Minden (DE)

( * ) Notice: Subject to any disclaimer, the term of this patent is extended or adjusted under 35 U.S.C. 154(b) by 383 days.

(21) Appl. No.: 12/326,401

(22) Filed: Dec. 2, 2008

(65) Prior Publication Data

US 2009/0139926 A1   Jun. 4, 2009

(30) Foreign Application Priority Data

Dec. 3, 2007   (DE) .......................... 20 2007 016 661

(51) Int. Cl.
  *B01D 39/18*  (2006.01)
  *A47J 31/00*  (2006.01)

(52) U.S. Cl. ...................................... 210/497.3; 99/279
(58) Field of Classification Search ............... 210/497.3; 99/279
  See application file for complete search history.

(56) References Cited

U.S. PATENT DOCUMENTS

2002/0066700 A1 *  6/2002  Dolfel et al. ............... 210/497.3
2002/0189461 A1 * 12/2002  Dolfel ............................ 99/279

* cited by examiner

*Primary Examiner* — Nam Nguyen
*Assistant Examiner* — Denise R Anderson
(74) *Attorney, Agent, or Firm* — Venable LLP; Robert Kinberg; Leigh D. Thelen

(57) ABSTRACT

A filter paper insert for a brewed beverage includes a filter paper shaped to form a cone-shaped filter having a side wall, a closed bottom and an upper filling opening. The side wall has three parallel, circumferential zones of increasing permeability in a direction from the closed bottom to the upper filling opening.

11 Claims, 1 Drawing Sheet

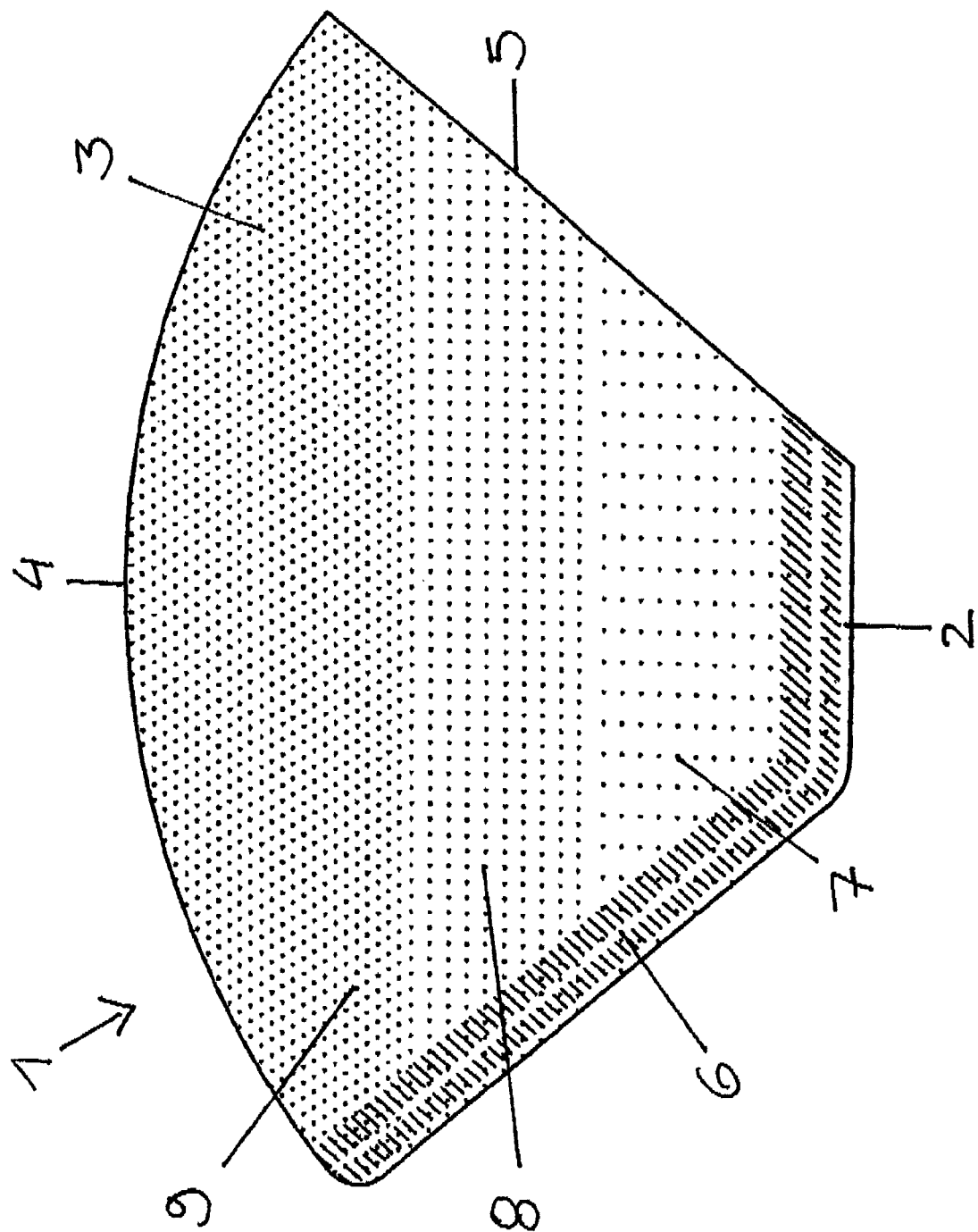

CONE SHAPED FILTER INSERT

CROSS-REFERENCE TO RELATED APPLICATION

This application claims the priority of the German patent document DE 20 2007 01 6661.3, filed on Dec. 3, 2007, the subject matter of which is incorporated herein by reference.

BACKGROUND OF THE INVENTION

The present invention relates to a cone-shaped filter insert, made of filter paper, for producing aromatic extracts, in particular of coffee, the filter insert having a bottom from which two opposite-arranged side walls extend upward to an upper filling opening, wherein the side walls are connected along the edges and wherein the permeability of the side walls is lower in a lower region than in an upper region of the filter insert. This type of filter insert is known per se.

The upper region of a known, generic filter insert is provided with a perforation zone that is produced with the aid of needle-punching or embossing, while the lower region of the filter insert is not subjected to a treatment. In the process, the perforation zone can be designed such that the permeability increases in the direction toward the upper opening of the filter insert.

When using a predetermined amount of an aromatic substance and a predetermined amount of brewing water, a brewed beverage of relatively high drinking strength is obtained on the whole, wherein the brewing water is simultaneously prevented from flowing over the upper edge of the filter insert.

SUMMARY

It is an object of the present invention to further modify the design of a generic filter paper insert to improve the quality and taste of a brewed beverage, in particular coffee.

The above and other objects are accomplished according to an embodiment of the invention wherein there is provided a filter paper insert for a brewed beverage, comprising: a filter paper shaped to form a cone-shaped filter having a side wall, a closed bottom and an upper filling opening; wherein the side wall has three parallel, circumferential zones of increasing permeability in a direction from the closed bottom to the upper filling opening.

BRIEF DESCRIPTION OF THE DRAWINGS

The present invention will be more readily understood from the following detailed description when read in conjunction with the accompanying drawing, in which:

FIG. 1 is a side view of a filter paper insert according to the invention.

DETAILED DESCRIPTION

FIG. 1 depicts a filter paper insert according to the invention, which is produced in the known manner from filter paper and is intended for producing aromatic extracts, in particular coffee.

The filter insert 1 comprises a bottom 2, from which two oppositely-arranged side walls 3 extend toward an upper filling opening 4. The side walls 3 are connected along the edges; one side by a folding edge 5 and the other side by a dual embossed seam 6. Alternatively, a single embossed seam 6 can also be used to connect both edges of the side walls 3.

The side walls 3 comprise a total of three zones 7, 8, 9 with different permeability. These zones 7, 8, 9 take the form of horizontal stripes that are positioned parallel to the bottom 2. These zones can have identical or varying widths. For example, in FIG. 1, the lower zone 7 and the upper zone 9 have a greater width than the center zone 8.

Varying the permeability of the zones 7, 8, 9 is achieved through perforation. Perforation can be created either with the aid of needle-punching or through embossing.

In one embodiment, varying the degree of permeability is achieved by changing the diameters of the individual holes within each perforation zone 7, 8, 9. The hole diameters for the lower zone 7 would thus be smaller than the hole diameters for the above-arranged central zone 8 and the diameters of the perforation holes in the upper zone 9 would have the largest diameters.

In another embodiment, while the same perforation hole diameter can be maintained throughout the entire filter paper, the permeability differences can be created by varying the number of perforation holes per square centimeter. As is shown in FIG. 1, the lower zone 7 has relatively fewer perforation holes per square centimeter than upper zone 9. For example, if zone 7 consists of only four to eight perforation holes per square centimeter, an increased permeability for central zone 8 and upper zone 9 can be created by progressively increasing the number of perforation holes per square centimeter. The central zone 8, for example, can comprise ten to fourteen perforation holes per square centimeter and the upper zone 9 can comprise approximately sixteen to twenty-six perforation holes per square centimeter.

In a further embodiment, decreasing levels of filter paper permeability can be achieved by using a combination of decreasing diameters for the perforation holes per zone and decreasing numbers of perforation holes per square centimeter per zone.

As a result of the differences in the permeability within the individual zones 7, 8, 9, the brewing water and the aromatic substance filled into the filter insert 1 are in contact for different lengths of time. These contact times decrease in an upward direction from the bottom region of the filter paper insert towards the filling opening 4 because of the increase in permeability of the filter paper. This prevents an overflow of the brewing water over the upper edge region of the filter insert.

The filter insert 1 can be used optimally if the discharge of hot brewing water is controlled. For example, filling in a first cycle only the lower zone 7 with water and filling during additional cycles the filter cone progressively higher towards the upper zone 9. If the filter insert is filled with a small amount of coffee grind, like enough for two cups of brewed coffee, the brewing operation is supplied a constant amount of hot water. However, if the filter is filled with a larger amount of coffee grind, for a larger amount of coffee, then the hot water supply is staggered to pause once the liquid reaches the zones located at the top of the filter insert to prevent an overflow.

It will be understood that the above description of the present invention is susceptible to various modifications, changes and adaptations, and the same are intended to be comprehended within the meaning and range of equivalents of the appended claims.

What is claimed is:

1. A filter paper insert for a brewed beverage, comprising:
   a filter paper shaped to form a cone-shaped filter having a side wall, a closed bottom and an upper filling opening;
   wherein the side wall includes a lower zone, a central zone and an upper zone, wherein each of the lower, central and upper zones comprises a parallel, circumferential zone of increasing permeability in a direction from the closed bottom to the upper filling opening, wherein each of the lower, central and upper zones of increasing permeability include perforation holes and a different width from the other two zones.

2. The filter paper insert of claim 1, wherein the perforation holes are of increasing sizes per zone toward the upper filling.

3. The filter paper insert of claim 1, wherein the perforation holes are in increasing quantity per zone toward the upper filling opening.

4. The filter paper insert of claim 1, wherein the perforation holes are of increasing sizes per zone and increasing quantity per zone toward the upper filling opening.

5. The filter paper insert of claim 1, wherein the central zone has a smaller width than the lower zone and the upper zone.

6. The filter paper insert of claim 1, wherein the lower zone consists of approximately 4-8 perforation holes per square centimeter.

7. The filter paper insert of claim 1, wherein the lower zone consists of approximately 6 perforation holes per square centimeter.

8. The filter paper insert of claim 1, wherein the central zone consists of approximately 10-14 perforation holes per square centimeter.

9. The filter paper insert of claim 1, wherein the central zone consists of approximately 12 perforation holes per square centimeter.

10. The filter paper insert of claim 1, wherein the upper zone consists of approximately 16-26 perforation holes per square centimeter.

11. The filter paper insert of claim 1, wherein the upper zone consists of approximately 21 perforation holes per square centimeter.

* * * * *